Oct. 4, 1927.
F. WOLF
1,644,318
SAMPLE DISPLAY DEVICE
Filed April 7, 1922    4 Sheets-Sheet 1
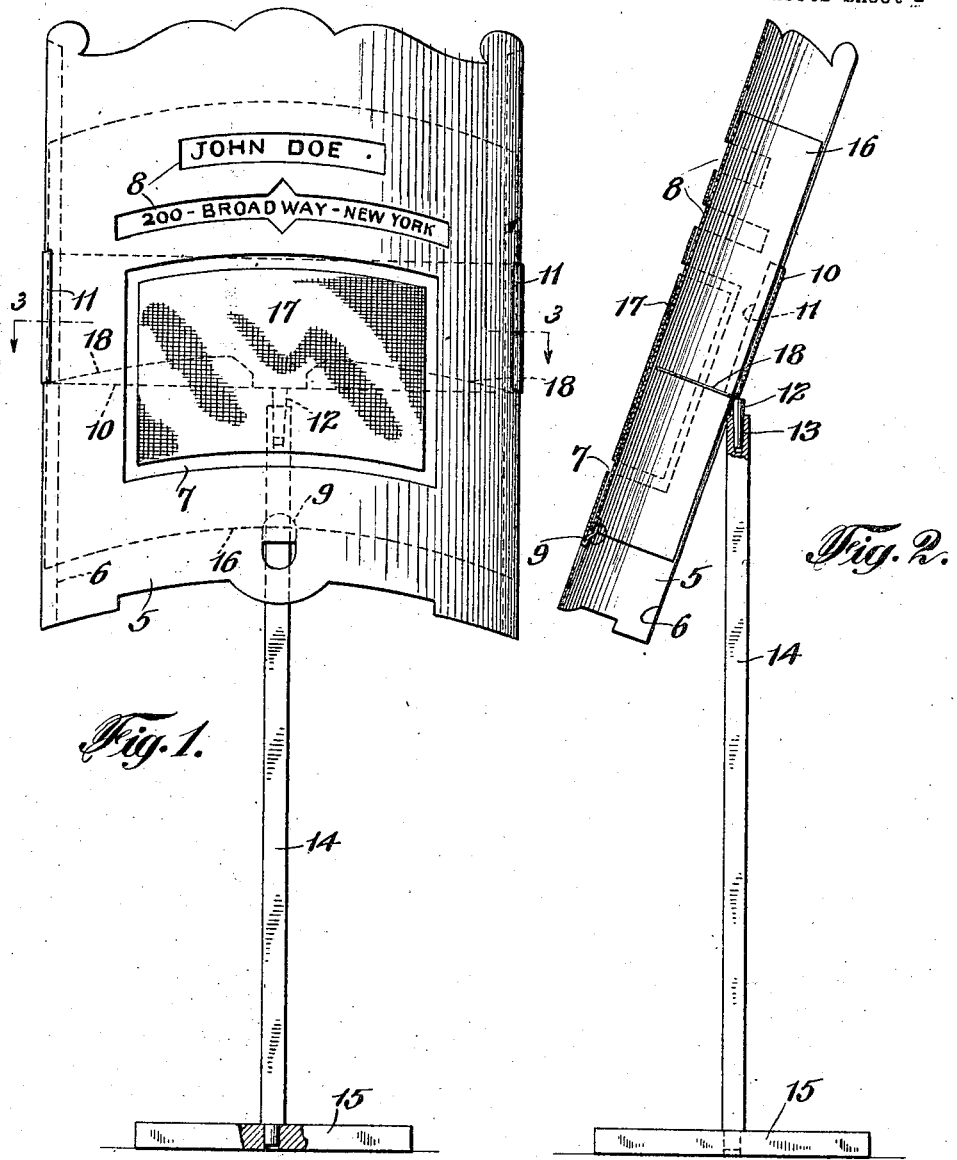
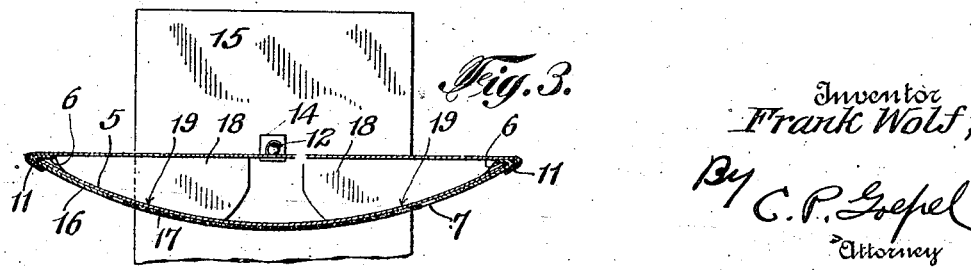
Inventor
Frank Wolf,
By C. P. Goepel
Attorney

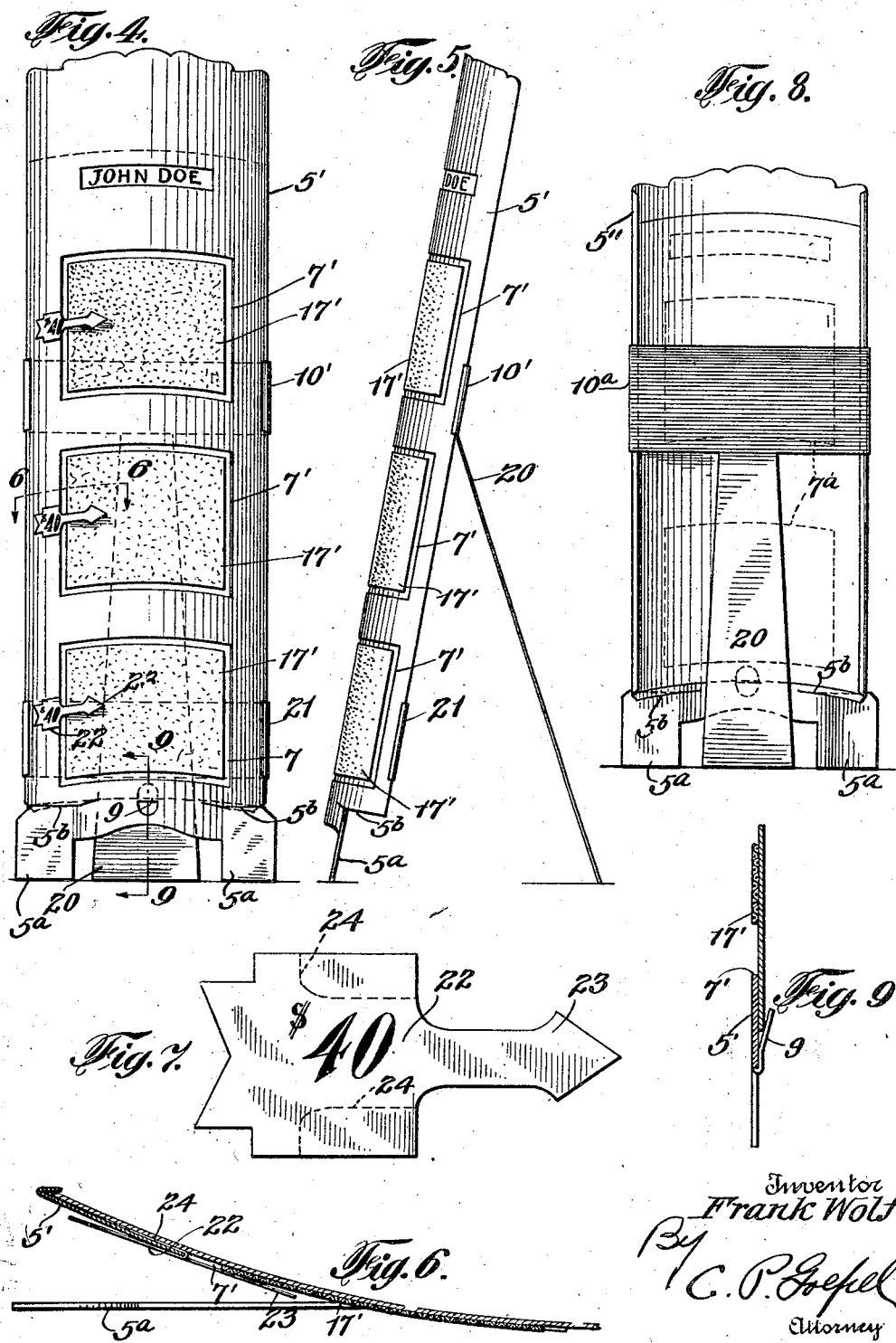

Oct. 4, 1927.
F. WOLF
1,644,318
SAMPLE DISPLAY DEVICE
Filed April 7, 1922     4 Sheets-Sheet 3
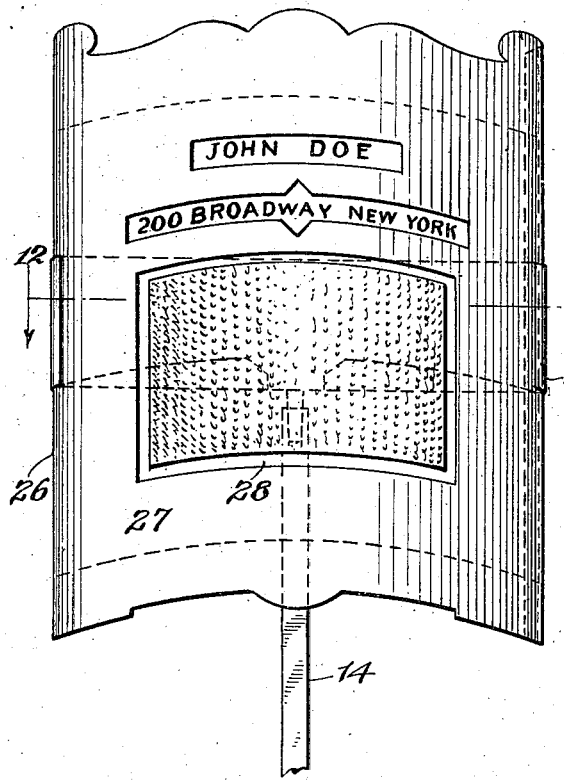
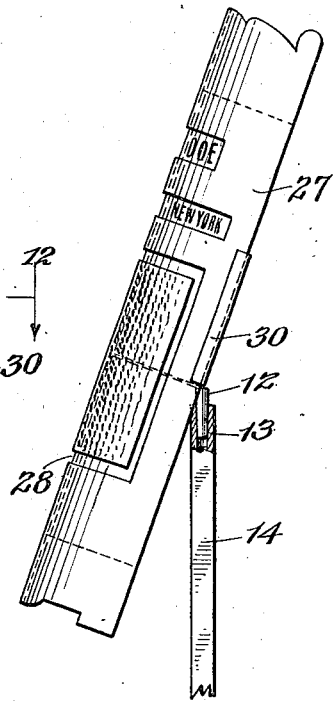
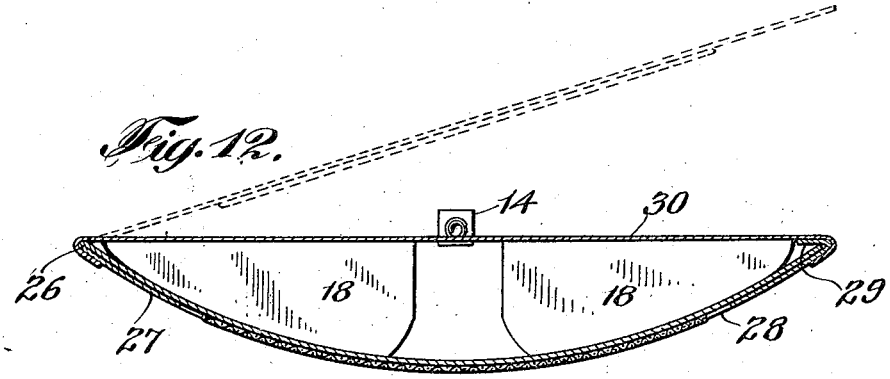
Inventor
Frank Wolf,
C. P. Goepel
Attorney Oct. 4, 1927.
F. WOLF
1,644,318
SAMPLE DISPLAY DEVICE
Filed April 7, 1922      4 Sheets-Sheet 4
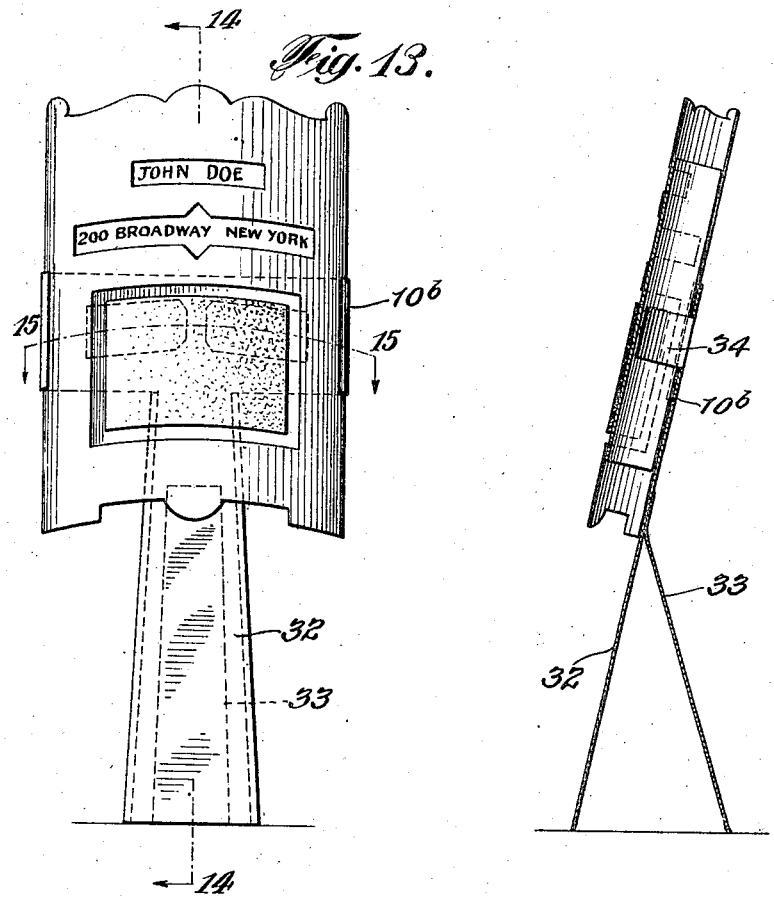
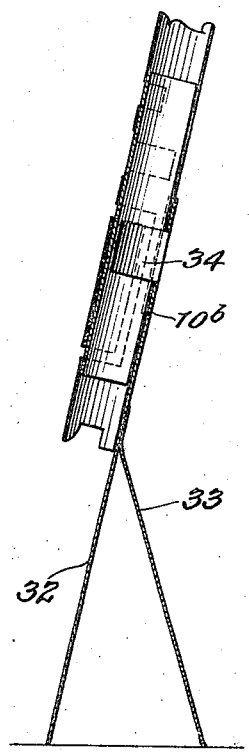
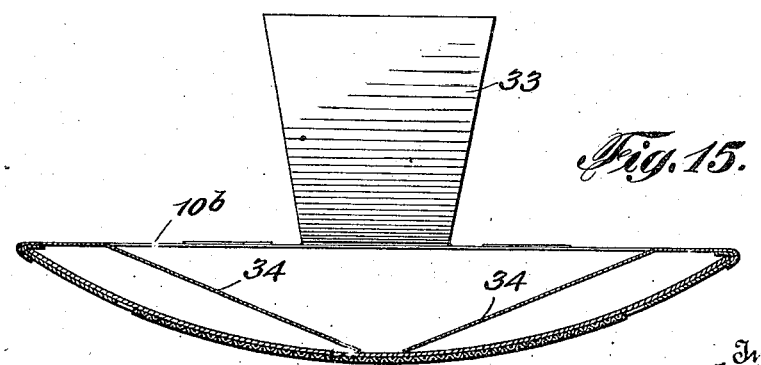
Inventor
Frank Wolf,
By C. P. Goepel.
Attorney Patented Oct. 4, 1927.

1,644,318

UNITED STATES PATENT OFFICE.

FRANK WOLF, OF NEW YORK, N. Y.

SAMPLE-DISPLAY DEVICE.

Application filed April 7, 1922. Serial No. 550,525.

This invention relates to an improved sample display device and has for its primary object to provide simple and inexpensive means for attractively displaying tailors' samples of various materials so that they will make a favorable impression upon the observer. It is another purpose of my present improvement to provide a display device of the above character which may be advantageously used in dressing a window or may be arranged upon a stand or table, the said device being of such construction that it may be easily lifted from its display position in order that the prospective purchaser may make a critical inspection of the display samples or feel the sample and ascertain the approximate texture and weight of the material.

The invention further comprehends a sample display device of such construction that one or more samples may be readily mounted in position and the samples easily and quickly changed whenever desired.

In one of the embodiments shown in the drawings I have disclosed a holder for the sample card in the form of a sheet metal plate having inturned flanges at its opposite edges adapted to receive the edges of the sample card. The holder plate and the sample card are then adapted to be bent into transversely curved form and the edges of the plate removably engaged in retaining flanges on the ends of a supporting plate which extends across the back of the holder. This supporting plate may be detachably mounted upon the upper end of a standard or it may be integrally formed with or secured to the upper end of an inclined leg or prop.

In another embodiment of the invention I have shown the sample card consisting of front and back portions hingedly connected along one of their longitudinal edges and the front portion having an opening in which the sample attached to the back portion of the card is displayed. In this form of the device the opposite side edges of the card are directly engaged in the retaining flanges on the ends of the supporting plate.

It is likewise a secondary feature of my present improvements to provide an improved price tag or marker which may be detachably engaged with one edge of the opening in the sample holder.

With the above and other objects in view, the invention consists in the improved sample display device and in the form, construction and relative arrangement of the parts thereof as will be hereinafter more fully described, illustrated in the accompanying drawings and subsequently incorporated in the subjoined claims.

In the drawings wherein I have disclosed several simple and practical embodiments of my present invention and in which similar reference characters designate corresponding parts throughout the several views;

Fig. 1 is a front elevation illustrating one form of the improved display device for displaying a single sample;

Fig. 2 is a vertical sectional view;

Fig. 3 is a horizontal section taken on the line 3—3 of Fig. 1;

Fig. 4 is a view similar to Fig. 1 showing another embodiment of the invention in the form of an easel having provision for displaying a series of samples;

Fig. 5 is a side elevation of the device shown in Fig. 4;

Fig. 6 is a detail horizontal section taken on the line 6—6 of Fig. 4;

Fig. 7 is a detail elevation of one of the detachable price tags or markers;

Fig. 8 is a rear elevation showing a slightly modified form of the device as shown in Fig. 4;

Fig. 9 is a detail vertical section taken on the line 9—9 of Fig. 4;

Figs. 10 and 11 are front and side elevations respectively, of another alternative embodiment of the invention;

Fig. 12 is a horizontal section taken on the line 12—12 of Fig. 10;

Fig. 13 is a front elevation showing a further modification of the device;

Fig. 14 is a vertical section taken on the line 14—14 of Fig. 13, and

Fig. 15 is an enlarged horizontal section taken on the line 15—15 of Fig. 13.

In Figs. 1 to 3 inclusive of the drawings, I have shown a form of my invention in which provision is made for the display of a single sample. The device is primarily designed for the purpose of displaying woolen tailoring materials, though the form and construction of the several embodiments of the invention as will be hereinafter disclosed, are not necessarily limited to such specific purpose, as they may obviously also be advantageously utilized for the purpose of displaying samples of dress goods or various other materials.

As is well known, in the repeated use of sample cards, usually of relatively stiff or heavy cardboard to the face of which the sample is attached, the surface of the card becomes soiled and unsightly. This is particularly the case when a white card carrying advertising matter is used. Therefore, I provide a sheet metal plate 5 which not only affords a protection for the surface of the card, but is also provided with means for retaining or holding the card in display position. This sheet metal plate may be of any desired ornamental form and of any preferred dimensions. It may also bear upon its surface suitable advertising matter. As herein shown, this flexible sheet metal plate is provided along its opposite side edges with inwardly turned longitudinally extending flanges 6 disposed at an acute angle with respect to the plane of said plate.

The holder plate 5 is further provided with an opening 7 in the central portion thereof, illustrated in the present instance as being of rectangular form. Above this opening one or more slots 8 are cut in the plate for a purpose which will presently become apparent.

Below the opening 8 a tongue 9 is struck therefrom and upwardly turned at one side of the plate, as clearly seen in Figure 2 of the drawings.

The holder plate 5 is adapted to be mounted in a relatively narrow supporting plate 10 which is provided at its opposite ends with the inturned angular flanges 11. This supporting plate 10 is of somewhat less length than the normal width of the holder plate 5 and is provided at the approximate center of its lower edge with a tapering spindle 12 which is adapted to be engaged in a socket 13 formed in the upper end of the standard 14, said standard at its lower end being suitably mounted in the base 15.

The sample card 16 consists of a flexible sheet of cardboard. To the surface of this cardboard sheet, the sample 17 is adhesively secured along its upper edge, said sample being of slightly less dimensions than the area of the opening 7 in the holder plate. The surface of the sample card may be provided with suitable printed matter and when said card is arranged in the holder plate 5 said printed matter is displayed through the slots 8.

Before mounting the holder plate in the support 10, the side edges of the card are engaged under the flanges 6 on the edges of said plate and said card moved downwardly until its lower edge is disposed between the body of the plate 5 and the upwardly extending tongue 9 thereon, at which time the sample 17 will be positioned in the opening 7. An inward pressure is now applied to the opposite side edges of the holder 5 so that said holder and the sample card therein are bent into concavo-convex form to such an extent that the side edges of the holder plate may be engaged under the end flanges 11 on the support 10. The tendency of the resilient holder plate to resume its normal straight form causes the side portions of said plate to exert a constant outward pressure against the flanges 11, thereby producing a high frictional resistance to any tendency of said plate to slide or shift longitudinally in the support.

The lower edge of the supporting plate 10 is provided with horizontally disposed flanges 18 the forward edges of which are curved as at 19 so that they will bear against the rear side of the sample card 16 and thus afford a brace or support for the sample card and the holder plate 5 to prevent buckling or distortion thereof in the event that undue pressure should be accidentally applied against the outer surface of the card or the supporting plate.

After the sample card has been properly mounted in the support 10 as above explained, the spindle 12 on the support is then engaged in the socket 13 of the display stand. It will be noted that the plate 10 extends at an angle with relation to the axis of the spindle 12 so that the holder 5 with the sample card therein is positioned at an inclination with respect to the standard 14. By reason of the convexity of the sample 17 on the card when positioned in the holder plate and mounted in the support 10, the window decorator may secure the best light effects by the exercise of good judgment in positioning the display device in the window so as to thereby obtain the most attractive display of the sample. It will also be observed that the salesman may readily remove any desired sample by simply lifting the holder from the supporting standard 14 and the prospective purchaser may minutely examine the sample and engage the free edge portion thereof between the fingers so that he may judge of the texture of the material, without removing the sample card from the holder plate. After exhibiting the sample the salesman can then readily again mount the holder upon the supporting plate.

In Figs. 4 to 9 of the drawings I have illustrated another embodiment of the invention wherein the holder plate 5' is of an appreciably greater length than in the form shown in Fig. 1 and is adapted to be mounted in the supporting plate 10' in the same manner as above described, said supporting plate in this case being formed upon the upper end of an inclined easel or supporting leg 20. In addition to the supporting plate 10' in which the side edges of the holder plate 5' are engaged at a point slightly above the longitudinal center of said plate, I provide a second plate 21 also having the inturned flanges at its ends similar to the supporting plate 10′ and in which the opposite side edges of the plate 5′ are adapted to be engaged at a point adjacent to their lower ends. This additional plate 21 serves to constrict the holder plate at its lower portion so that the same degree of convexity of said plate and the sample card arranged therein is secured throughout their length. In this case the holder plate 5′ is provided with a series of spaced openings 7′ to accommodate the series of spaced samples 17′ on the card. In spaced relation to its lower end edge the holder card 5′ is slit or cut inwardly for a short distance from its opposite longitudinal edges as indicated at 5ᵇ and the central lower edge portion of the plate is cut out or recessed to provide spaced supporting feet 5ᵃ which are adapted to contact with the surface upon which the device is arranged. By the provision of the slits 5ᵇ, it will be understood that when the body portion of the plate is bent into concavo-convex form, the laterally extending feet 5ᵃ will not be bent but will extend from the intermediate curved end portion of the plate in straight lines as indicated in Fig. 6 of the drawings.

In connection with this embodiment of the invention I have also shown an improved form of price marker 22. The body of the marker is formed with a lateral extension terminating in an arrow head 23 and upon this end of the body plate resilient fingers 24 are provided at each side of said extension and project in an opposite direction from the extension and at a slight angle with respect to the plane of the body portion of the marker. This marker may be made either in the form of a metal stamping or of heavy cardboard. The two fingers 24 are adapted to be engaged under one of the side edges of the openings in the holder plate in which the sample is displayed with the arrow head 23 overlying the surface of the sample. Owing to the resiliency of the fingers 24 engaged between the holder plate and the sample card, the body of the marker and the extension thereof are maintained in tangential relation to the convex surface of the body plate and the sample thereby prominently displaying the price figures in association with the sample. This marker may, in addition to the price, bear any other desired advertising matter.

In Fig. 8 I have shown an alternative of the construction shown in Fig. 4 wherein the holder plate 5″ is somewhat shorter and the supporting plate 10ᵃ is of greater width than that shown in Fig. 4 of the drawings. In this case, the use of the supplementary plate 21 may be dispensed with as the single wide plate 10ᵃ will suffice to retain the holder plate in its bent form and with its opposite edges in approximately parallel relation throughout their length. I have illustrated this short holder for the sample card as provided with two of the display openings 7ᵃ. It will, therefore, be manifest that in any of the cases above discussed, various numbers of the display openings to receive a corresponding number of the material samples may be provided.

In Figs. 10 and 11 of the drawings I have shown still another embodiment of my invention wherein the use of a separate holder plate may be dispensed with. In this case the sample carrying card 25 consists of front and rear sections hingedly connected to each other along one of their longitudinal side edges as at 26. These two sections may be formed from one continuous sheet of cardboard of requisite thickness or may be made from separate sheets hingedly connected to each other in any suitable manner. The outer section 27 of the sample card which is provided with the opening 28 through which the sample is displayed, is provided at its opposite side edge with an inwardly turned flange 29 which is adapted to receive the free edge of the rear portion of the card. It will be understood that this flange 29 will yield sufficiently to enable the edge of said rear portion to be readily engaged under said flange or removed from engagement therewith. After the sample has been secured upon the rear section of the card 25 and the two sections engaged upon each other, they are then bent together into the curved cross-sectional form seen in Fig. 12 and the opposite side edges of the card inserted beneath the flanges on the ends of the supporting plate 30 in the manner previously described. The form and construction of the support 30 is the same as that first referred to and it may be mounted either upon the supporting standard or may be provided with the inclined easel or prop as shown in Fig. 5.

In connection with this form of the invention, it is obvious that if desired, the front section 27 of the sample card might be of metal and the rear section of cardboard suitably hinged along one of its edges to said metal section, or on the other hand, both sections might be made of sheet metal. Likewise, it is evident that in the several forms of the device previously described, the sample card might consist of a thin flexible metal plate in lieu of the cardboard sheet.

In Figs. 13, 14 and 15 of the drawings I have disclosed a further modification of the device in which the supporting plate 10ᵇ is integrally formed upon the upper end of a leg 32 to the rear side of which the inclined prop 38 is attached at its upper end and extends in divergent relation therefrom so as to maintain the supporting plate and its leg in a vertically inclined position. The plate 10ᵇ is provided at its ends with the inturned flanges as in the other forms of the invention above referred to. From the central portion of said plate the horizontally extending opposed resilient arms 34 are cut, said arms at their outer ends remaining integrally connected with the body of the supporting plate and projecting forwardly at an angle with respect to the plane thereof and in converging relation to each other, the inner ends of said arms being spaced apart as clearly shown in Fig. 15 of the drawings. When the sample card is arranged in the holder plate and said holder plate and the card bent into concavo-convex form and the flanged edges of the plate engaged under the flanges of the support 10ᵇ as above described in connection with the embodiment of the invention shown in Fig. 1 of the drawings, the resilient arms 34 exert a bearing pressure against the concave face of the card adjacent to its central portion and subserve the same purpose as the flanges 18 of the construction shown in Fig. 3 of preventing the accidental bending or distortion of the intermediate portion of the card carrying the sample which is exposed in the opening of the holder plate. While, in the illustration of the embodiment of the invention I have shown the holder plate provided with only a single opening to receive the display sample, it will be apparent that the holder plate may be made in various lengths and provided with a number of such openings for receiving a series of samples, if desired.

From the foregoing description considered in connection with the accompanying drawings, the construction, and manner of use of the several embodiments of the device herein disclosed, will be readily disclosed. My improved sample display device can be made in various sizes, and enables the retailer to easily and quickly change the samples of materials which are on display and provides means for most attractively presenting the material samples to the observation of prospective purchasers. I have above described several simple and practical forms of my invention, but it is nevertheless apparent that the device is susceptible of embodiment in various other alternative constructions. Accordingly, I reserve the privilege of resorting to all such legitimate changes in the form, construction and relative arrangement of the several parts as may be fairly embodied within the spirit and scope of the appended claims.

I claim:

1. In a sample display device, a sheet of flexible material having a fabric sample attached to one side thereof curved from a flat condition into a concavo-convex form, a supporting member adapted to extend across the concave side of the sheet and having inwardly turned flanges at its edges to receive the opposite side edges of the curved sheet, and an outwardly extending member between said inturned flanges interposed between the supporting member and the concave side of the sheet to hold it with the sample in conjunction with said outwardly extending member around which the sheet and sample will be curved outwardly.

2. In a sample display device, a sheet of flexible material having an opening therethrough and an inwardly turned flange at one side edge thereof, a sheet of flexible material positioned with an edge extending under the inwardly turned flange on the first said sheet of flexible material and having a fabric sample attached to one side thereof so as to be exposed through the aforesaid opening, said flexible sheets being bent from a flat condition into a concavo-convex form, a supporting member adapted to extend across the concave side of the sheets and having inwardly turned flanges at its edges to receive the opposite side edges of the curved sheets and retain them in concavo-convex form, and members extending inwardly from the supporting means adapted to engage the concave side of the sample carrying sheet and hold it in position with the sample extending through the opening in the first mentioned sheet of flexible material.

3. In a sample display device, a sheet of flexible material having inwardly turned side edges and openings therethrough, a sample sheet having its edges extending under the flanges of the flexible sheet and having fabric samples thereon exposed through said openings, said flexible and sample sheets being curved from a flat condition to a concavo-convex form, a supporting member of a length considerably less than that of the flexible sheet and adapted to extend across the concave side of the sheet and having inwardly turned flanges at its ends to receive the inwardly turned flanges of the flexible sheet and retain the same in its concavo-convex form, said support having angularly disposed bracing means extending inwardly and engaging the concave side of the sample sheet and holding it against the concave side of the flexible sheet.

4. In a sample display device, a sheet of flexible material having an opening therein and its side edges provided with inwardly turned flanges, a sample sheet adapted to have its edges extend under the flanges of the flexible sheet, said flexible and sample sheets being curved from a flat condition into a concavo-convex form, a supporting member adapted to extend across the concave side of the sheet and having inwardly turned flanges at its ends to receive the inwardly turned flanges of the flexible sheet and retain the same in its concavo-convex form, a supporting leg for said support and an angularly disposed bracing means adapted to engage the concave side of the sample sheet and hold it against the concave side of the flexible sheet.

5. In a sample display device, a support comprising a flat strip having inturned flanges at its side edges adapted to hold a flexible display card by its edges engaged within said flanges, a projecting member between said flanges on said strip and extending outwardly therefrom whereby the flexible display card will be curved outwardly around said projecting member while its edges are held by said flanges, and means for holding the support in a substantially upright position.

6. In a sample display device, a sheet of flexible material, and curved from a flat condition into a concavo-convex form, a supporting member adapted to extend across the concaved side of the sheet, and having inwardly turned flanges at its edges to receive the opposite side edges of the curved sheet, and an outwardly extending member arranged between the concave face of the curved sheet and the inner flat face of the supporting member, and having a convex edge bracing the curved sheet throughout approximately its entire length, and holding the same in said curved position.

7. In a sample display device, a sheet of flexible material curved from a flat condition into a concavo-convex form, a supporting member adapted to extend across the concave side of the sheet and having inwardly turned flanges at its edges to receive the opposite side edges of the curved sheet, and outwardly extending members carried by the supporting member and having a convex outer edge, and engaging the concave face of the curved sheet throughout approximately its entire length, and holding the same in said curved position.

In testimony that I claim the foregoing as my invention, I have signed my name hereunder.

FRANK WOLF.